United States Patent Office 3,479,891
Patented Nov. 25, 1969

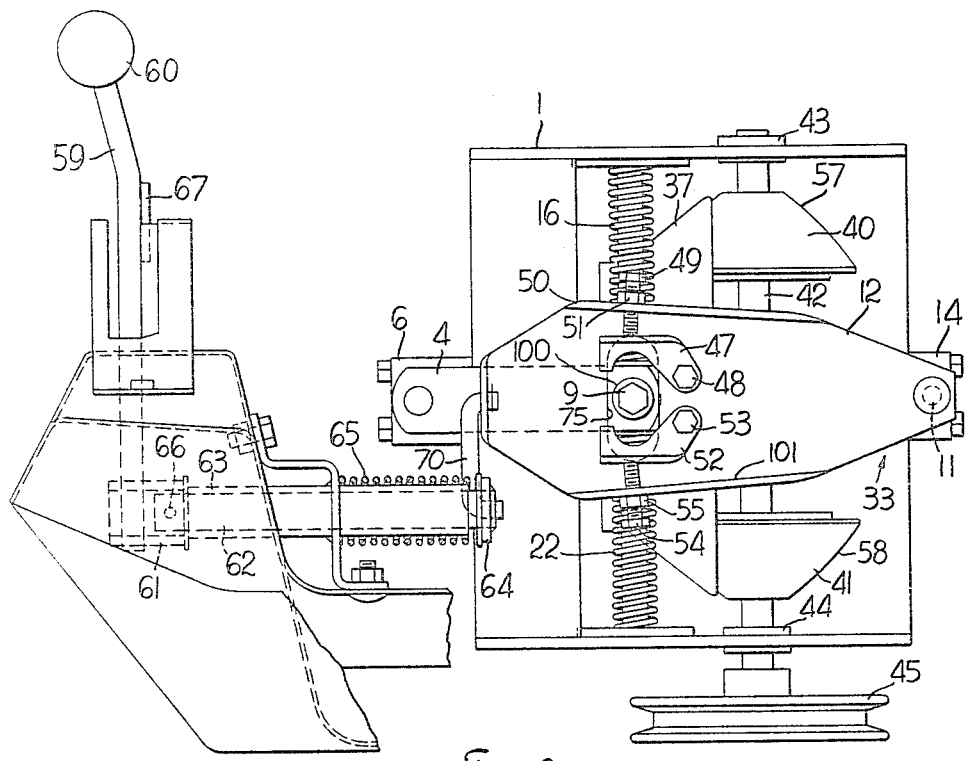
Fig. 3
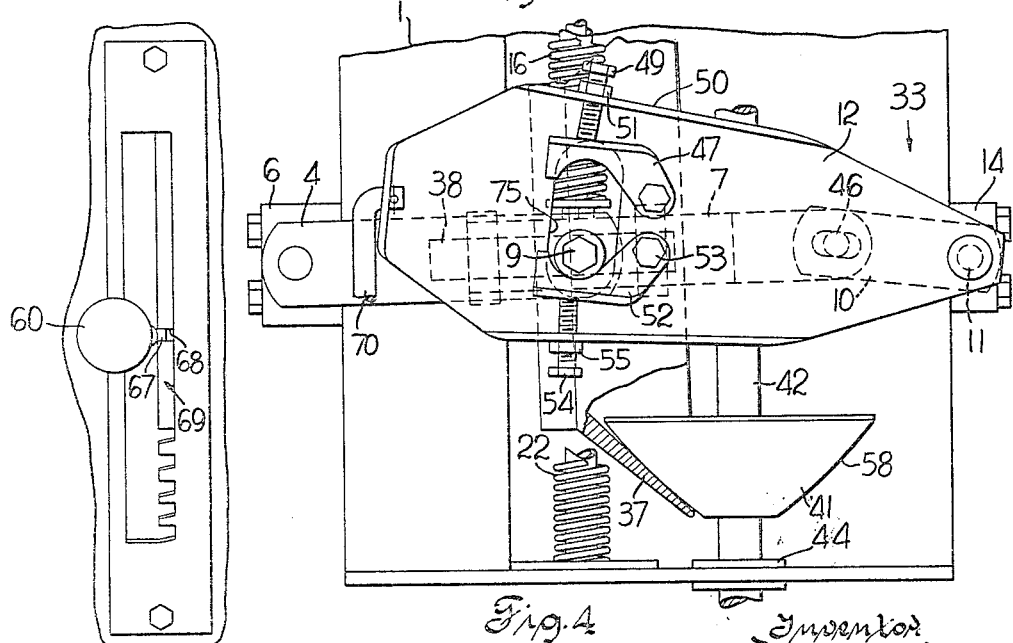
Fig. 4
Fig. 5

3,479,891
FRICTION DRIVE TRANSMISSION
Robert A. Moore, Waukesha, Wis., assignor to Allis-Chalmers Manufacturing Company, Milwaukee, Wis.
Filed Mar. 26, 1968, Ser. No. 716,131
Int. Cl. F16h 15/34
U.S. Cl. 74—191                                                      10 Claims

ABSTRACT OF THE DISCLOSURE

A variable speed transmission using conical power transmitting surfaces and mechanical means to vary the contact diameter between frictionally engaging cones through incremental movement across the cone surfaces.

---

This invention relates to a vehicle transmission and more particularly to a variable speed friction drive transmission using conical friction surfaces with means for varying the point of driving contact between a hollow cone driven member and a modified cone shaped driving member which frictionally engage each other.

A number of principles have been used for variable speed transmissions of which one of these being friction gearings to provide infinite speed variations. The characteristics of many gear mechanisms are such that the friction surfaces resisting movement of one friction gear relative to another is prohibitive because of the heavy contact pressure required to produce a power transmitting torque.

This invention provides a means whereby a resilient member is used to transmit the application force from the actuating means to the driven gear to maintain a power transmitting torque. A means is provided to move the driven gear relative to the driving gear to change the contact diameters of the driving and the driven gears. This is accomplished through a mechanical actuating means applying a clutch engaging force through a torsion bar to maintain a power transmitting torque while simultaneously the driven gear is pivoted relative to the driving gear to provide a variable gear ratio for the transmission unit.

It is an object of this invention to provide a variable speed transmission having a cone driving member and a pivotal hollow cone driven member.

It is another object of this invention to provide a double driving cone member, and a hollow cone driven member mounted for pivotal movement on two axes to provide infinite speed variations in the forward and reverse directions depending on the direction of pivotal movement of the driven cone member relative to the double driving cone member.

It is a further object of this invention to provide a cone driving member and a hollow cone driven member with a mechanical clutching and shifting means which applies a contact pressure through the driven cone to maintain a firm and positive engagement with the driving cone while simultaneously changing the pitch diameters defined by the point of contact between the two members to infinitely vary the speed ratio of the transmission within a predetermined range.

It is a further object of this invention to provide a friction double cone driving member, and driven member in a transmission with means to apply the engaging force between the driving and driven members and means simultaneously vary the effective pitch diameters of the two members.

The objects of this invention are accomplished by the use of a double cone drive member mounted on a frame having an axis of rotation fixed relative to the frame. A hollow cone driven member is mounted on a tiltable bearing mount, tiltable about a primary and secondary axis and is pivotally connected to a resilient member which in turn is pivoted by an actuating means. The actuating means initially engages the driven cone with the driving cone to provide a power transmitting torque through the transmission. Subsequent to engagement, the resilient member continues to apply the clutch engaging force between the driven and the driving cones while simultaneously the driven cone is walked around the external divergent cone surface of the driving member to change the effective pitch diameter between the driving cone and the driven cone. The power transmitting pressure is maintained while the speed ratio is changed to thereby provide an infinitely variable speed ratio within a predetermined range and a positive power transmitting torque delivered through the transmission.

The preferred embodiments of this invention will be described in the following paragraphs and illustrated in the attached drawings.

FIG. 3 illustrates a front elevation view showing the transmission and the actuating means.

FIG. 4 illustrates the transmission in the actuated position.

FIG. 5 illustrates a plan view of the operating lever and quadrant.

Figures 1, 2:
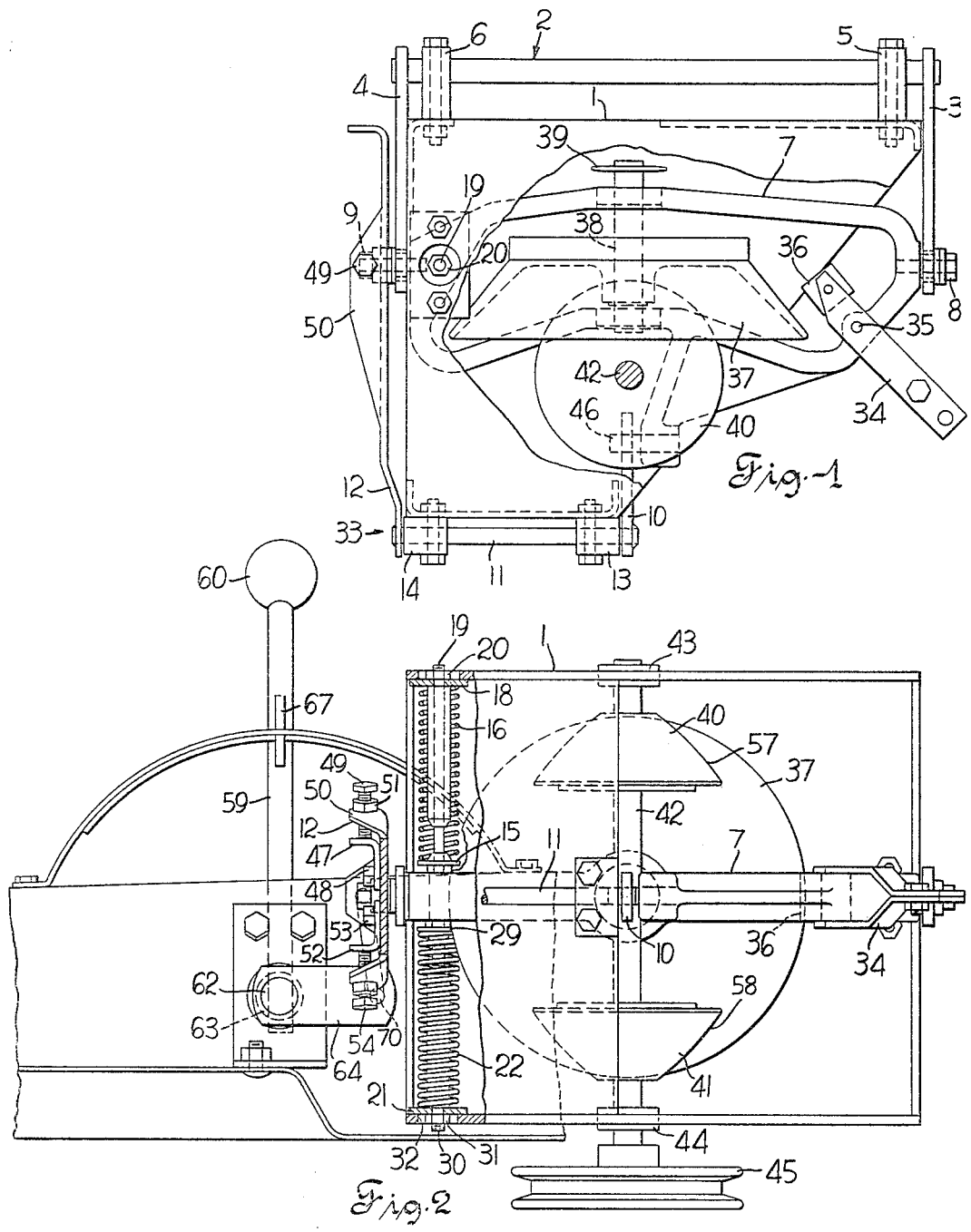
FIG. 1 illustrates a plan view with a portion of the view broken away to illustrate the relative position of the components.
FIG. 2 illustrates a side elevation view of the transmission and actuating means with a fragmentary section broken away to illustrate means for centering a tiltable bearing mount.

Referring to FIG. 1, the transmission is shown. The frame 1 is adapted for mounting on the vehicle chassis. The bracket 2 includes a rod integrally connected with the arms 3 and 4 which are journalled in the journals 5 and 6 which are attached through the bracket 1. Subframe 7 is pivotally connected to the arms 3 and 4 by means of the bolts 8, 9 respectively. The subframe 7 is pivotally supported on the bracket 2 which in turn is tiltable in the journals 5 and 6 on the frame 1. The subframe 7 is also pivotally connected to an actuating arm 10 which is integrally fastened to the torsion rod 11 and the shifting arm 12. The torsion rod 11 is pivotally mounted in the bearings 13 and 14 which are fastened to the frame 1.

FIG. 2 illustrates a side elevation view of the transmission with a portion broken away to illustrate means for centering the subframe 7 and maintain the transmission in a neutral position. The spring retainer 15 is received within the centering spring 16 which extends upwardly to engage the guide 18. The bolt 19 threadedly engages a nut 20 which is received within an opening of the upper portion of the frame 1.

Similarly, a spring retainer 29 is received within the centering spring 22 which is compressed between the guide 21 and the retainer 29. The bolt 30 threadedly engages the nut 31 which is received in an opening 32 in the frame 1. It can be seen that adjustment is provided to control the compression on the centering springs 16 and 22 and maintain the centered position of the subframe 7 within the frame 1. This centers the bracket 2, the subframe 7, and actuating member 33 in a neutral position.

The brake lever 34 is pivotally mounted on the pin 35 and carries a shoe 36 which engages the external periphery of the driven cone 37. The driven cone 37 is keyed to a shaft 38 which is rotatably mounted in the bearings of the subframe 7. The sprocket 39 provides an output connection on the shaft 38 to drive the vehicle.

The driven cone 37 is pivotally mounted in its neutral position for engagement upon actuation with either of the driving cones 40 or 41 which are fastened to the drive shaft 42. The drive shaft 42 is mounted in the two bearings 43 and 44 in the frame 1. A drive sheave 45 is adapted for being driven by a V-belt drive powered by an engine.

Referring to FIG. 3, actuator 33 consists of a shaft 11, actuating arm 10, and a shifting arm 12 all integrally constructed. As the shifting arm 12 pivots with the shaft 11, the actuator arm 10 which is pivotally connected to the subframe 7 by the pin 46 pivots the subframe 7 until the driven cone 37 frictionally engages either of the driving cones 40 or 41 depending on which way the subframe is pivoted. Engagement of the driven cone 37 with a driving cone 40 operates as a clutching mechanism. The transmission is then engaged and a power driving torque is transmitted through the transmission from the drive cone 40 to the driven cone 37 and is delivered at the sprocket 39 to drive the rear axles.

Upon further pivotal movement of the shifting arm 12 the abutment 52 which is fastened to the shifting arm 12 by means of the bolt 53 engages the bearing assembly 100. The abutment 52 can be pivoted downward or upward in response to a bolt 54 threadedly engaging a rolled over transverse extending flange 101 on the shifting arm 12. The bolt 54 extends to engage the abutment 52 and is locked in an adjusted position by means of the locknut 55. Similarly, the upper portion of the shifting arm 12 carries an abutment 47 pivotally supported on a bolt 48 which is adjusted by the bolt 49 and locknut 51. The abutment 47 controls the reverse movement of the transmission In other words, when the shifting arm 12 is pivoted in the opposite direction, the reverse rotation of a driven cone 37 is effected.

Continuing movement of the shifting arm 12 will cause the abutment 52 to pick up the bearing assembly 100 and cause the pivotal axis of subframe 7 defined by the arms 3 and 4 pivotally supporting the subframe 7 to move upwardly. The shaft 11 will operate as a torsion rod due to the stress placed on the rod which in turn applies an increased force between the contact point between the driven cone 37 and the driving cone 41. The driven cone 37 must walk around a peripherial surface of the cone surface 58 of the driving cone 41. It is pointed out that the preferred embodiment of this invention includes a surface 57 and 58 which is slightly convex which will permit the driven cone 37 to back around the surface more readily and to provide a variable radius of contact with the driving and driven cones.

The operation of this device will more specifically be described in the subsequent portion of this application. The actuation is accomplished through an actuating lever 59 which has a handle 60. The lever 59 is fastened to the sleeve 61 and pivotally connected to the rod 62 by the pin 66. The shaft 62 extends through the sleeve 63 and is fastened to an arm 64 which is more clearly shown in FIG. 2. The compression spring 65 biases the shaft 622 axially to cause the ear 67 to drop into a slot 68 in the ratchet 69. The lever 59 is moved laterally against the compressive force of spring 65 to disengage itself from the ratchet 69 it is free to move in a pivoting manner for actuation of the clutch and shifting of the transmission. The arm 64 is connected by a link 70 to the shifting arm 12 which operates as described above.

FIG. 4 illustrates the actuating position of the transmission in which the clutch is engaged and the variable speed transmission is being shifted. In this position it is noted that the driven cone 37 is frictionally engaging the driving cone 41 and moving the assembly pivotally upward causing a shifting movement of the engaging surfaces of the driven cone 37 and the driving cone 41. The specific operation will be described subsequently.

Referring to FIGS. 1, 2 and 3, the clutching mechanism for the transmission is disengaged. As the lever 59 is moved laterally, the ear 67 disengages from the ratchet 69 and the lever 59 rotates countercloskwise as viewed in FIG. 2 on the axis of the shaft 62. This rotating movement of the shaft 62 causes the arm 64 to move upwardly. It is understood that a lever 59 may be rotated clockwise or counterclockwise depending on the direction which the operator wishes to drive the vehicle. Assuming that the lever 59 is moved counterclockwise in FIG. 2, the link 70 will move upward causing the shifting arm 12 to also pivot upwardly on the axis of the shaft 11. This in turn causes the actuating arm 10 which is pivotally connected to the subframe 7 to also pivot upwardly. An upward pivoting movement of the subframe 7 will cause the friction facing on the internal periphery of the driven cone 37 to engage with the small diameter portion of the driving cone 41. Essentially the large pitch diameter of the driven cone 37 and the small diameter of the driving cone 41 will initially engage. Upon engagement of the driving and the driven cones, the shaft 11 will be stressed and a torsion reaction will be created in the shaft 11 which produces a drive transmitting pressure between the cones. Power will be transmitted through the transmission in response to the force between the driving and driven cones. An increased rotation of the shifting arm 12 also increases the torque on the rod 11 however movement of the pivoting axis of the subframe 7 will be slight since the springs 16 and 22 tend to hold the pivoting axis of the subframe 7 in a stationary position.

This pivoting action of actuating arm 12 is continued until the abutment 52 on the shifting arm 12 engages the bearing assembly 100 on the subframe 7. Abutment 52 which can be adjusted to vary the size of the opening 75 which will vary the torsion on shaft 11. The abutment 52 engages the bearing assembly 100 causing the pivoting axis of the subframe 7 to shift from its centered or neutral position.

A continued upward movement of the shifting arm 12 pivotally carries the subframe 7 which in turn carries the driven cone 37. As the shifting arm 12 moves upwardly the driving cone tends to shift around the peripheral surface of the driving cone 41, and the torsion of the shaft 11 remains relatively constant. While a larger pitch diameter on the driving cone 41 forms a contact point with a smaller pitch diameter on the driven cone 37, the transmission output torque decreases with an increase in the speed ratio of the transmission. A continued movement of the shifting arm 12 continues to shift the speed ratio until a small pitch diameter on the driven cone 37 engages a large pitch diameter on the driving cone 41 and the point of contact then causes the transmission to operate in a high speed range. The range of speed is infinite between the range of low speed and high speed.

To shift the transmission to a lower range the actuating lever 59 is rotated in a clockwise direction and the speed ratio of the transmission changes. The transmission again shifts to the low speed range and further movement in the clockwise rotation of the lever 59 will cause the clutch to disengage completely and the transmission will again be placed in neutral. For the purpose of illustration it will be assumed that a counterclockwise direction of rotation of the lever 59 as viewed in FIG. 2 will cause a forward direction of movement for the transmission and a counterclockwise rotation of the lever 59 will cause a reverse direction of the transmission and vehicle.

It is understood that the speed ratios for forward and reverse are the same and the actuation is the same except a reversal in the rotation of the actuating lever 59 provides engagement and operation of the transmission in reverse. It is noted that the initial engagement of the driven cone 37 with the driving cone 40 acts essentially as a clutching means. The shaft 11 is stressed as the torque is placed on the shaft and the torque in the shaft 11 transmits the force to engage the clutch. The greater the torque on the shaft 11, the greater the force applied to engage the clutch. The centering springs 16 and 22 maintain the pivoting axis of the subframe 7 in substantially the same position. The centering springs 16 and 22 do not provide an application force but merely tend to locate the axis of the pivot for the subframe. An increased torque is created in the shaft 11 until the shifting arm 12 carrying the abutments 47 and 52 engages the bearing assembly 100 which is turn will then cause a shifting of the variable speed transmission. The variable speed transmission operates initially in the low range. It is shifted as the abutment 47 engages the bearing assembly 100 causing the pivoting axis of the subframe 7 to pivot in an arc about the axis of the bracket 2. The cone 37 receives the driving force from the driving cone 40 and continues to transmit this driving torque to the output sprocket 39. As the transmission is shifted the driven cone 37 must back around the conical surface of the driving cone 40. It is pointed out that the driving cone friction surface is preferably not a true conical surface but is somewhat convex to permit easier movement of the driven cone around the driving cone 40 and a smoother shifting operation.

As the driven cone surface shifts around the driving cone surface 40 the torque in the shaft 11 is maintained to provide a continuing contact force for engagement of the clutch and transmission of torque through the transmission. The variable torque of the shaft 11 permits shifting of the driven cone 37 relative to the driving cone 40 by changing the rate of pivot around the secondary axis which is the pivoting axis of the bracket 2 and the primary axis which is the pivotal axis of subframe 7.

The embodiments for the invention in which an exclusive property or privilege is claimed are defined as follows:

1. A variable speed friction drive transmission comprising, a frame adapted for mounting on a vehicle chassis, a cone driving member defining a fixed axis of rotation on said frame, a subframe, a bracket means pivotally mounted on said frame and pivotally supporting said subframe, a driven cone member defining a fixed axis of rotation of said subframe, resilient means biasing said subframe to a neutral position with said driven cone member axis substantially perpendicular to said driving cone members axis, an actuating member including pivotally resilient portion mounted on said frame and pivotally connected to said subframe, an actuating mechanism pivotally connected to said actuating member to tilt said subframe and frictionally engage the driven cone member with the driving cone member and cause the radii of the point of contact between said driven cone member and said driving cone member to vary and thereby provide a variable speed ratio of the transmission.

2. A variable speed friction drive transmission as set forth in claim 1 wherein the driving cone member defines a convex peripheral surface which engages a conical surface on the driven cone member.

3. A variable speed friction drive transmission as set forth in claim 1 wherein said actuating member consists of two arms connected to a torsion rod in which the torsion rod is stressed to create a torque which in turn causes an application of pressure between the driving cone member and the driven cone member to engage the transmission.

4. A variable speed friction drive transmission as set forth in claim 1 wherein resilient adjustable springs are positioned to center the pivoting axis of the subframe and to maintain a substantially constant location of the pivoting axis of said subframe relative to the frame for initial engagement of the cone members and allow shifting of the pivoting axis when the transmission speed ratio is shifted.

5. A variable speed friction drive transmission as set forth in claim 1 wherein said actuating member includes a shifting arm having means to contact said bracket means and has adjusting means to adjustably control the relationship of the contacting of said shifting arm with the bracket means for pivoting on the pivoting axis of said bracket means relative to the initial engagement of the cone members.

6. A variable speed friction drive transmission as set forth in claim 1 wherein the pivoting axis of the subframe remains substantially constant during initial engagement of the cone members and the pivoting axis of the subframe shifts as a bracket means pivots during changing of the speed ratio when the transmission is operating.

7. A variable speed friction drive transmission as set forth in claim 1 wherein the bracket means is pivotally supported on the frame and the actuating member is pivotally supported on the frame and said subframe is pivotally connected intermediate said actuating member and said bracket means, said actuating member thereby causing said subframe to primarily pivot about its pivoting axis and secondarily pivot about the bracket axis when the transmission is shifted.

8. A variable speed transmission as set forth in claim 1 wherein said subframe initially pivots about its pivoting axis defined by its connection to the bracket means and subsequently also pivots about the pivoting axis of the bracket means while changing its rate of pivot on the subframe pivoting axis to create a torque in said resilient portion of said actuating member when the speed ratio of the transmission is changed.

9. A variable speed friction drive transmission as set forth in claim 1 wherein a resilient actuating arm of said actuating member biases the subframe to a position wherein the driven cone engages and a nonresilient shifting arm of said actuating member shifts the speed ratio of said transmission when the tarnsmission is operated.

10. A variable speed friction drive transmission as set forth in claim 1 wherein the actuating means for the transmission has a high mechanical advantage and the actuating force for engaging the transmission is transmitted through a torsion rod included in said actuating member which applies a positive engaging force to provide high power transmitting torque through the transmission.

References Cited
UNITED STATES PATENTS 3,306,132   2/1967   Davis _____ 74—721
3,410,156  11/1968  Davis _____ 74—191 XR FRED C. MATTERN, Jr., Primary Examiner J. A. WONG, Assistant Examiner U.S. Cl. X.R.

74—202